(12) United States Patent
Stringer

(10) Patent No.: US 10,598,009 B2
(45) Date of Patent: Mar. 24, 2020

(54) SYSTEM, METHOD, AND COMPUTER PROGRAM PRODUCT TO DETERMINE PLACEMENT OF FRACTURE STIMULATION POINTS USING MINEROLOGY

(71) Applicant: Halliburton Energy Services, Inc., Houston, TX (US)

(72) Inventor: Charles Francis Stringer, Houston, TX (US)

(73) Assignee: HALLIBURTON ENERGY SERVICES, INC., Houston, TX (US)

( * ) Notice: Subject to any disclaimer, the term of this patent is extended or adjusted under 35 U.S.C. 154(b) by 165 days.

(21) Appl. No.: 15/799,842

(22) Filed: Oct. 31, 2017

(65) Prior Publication Data
US 2018/0066516 A1 Mar. 8, 2018

Related U.S. Application Data

(62) Division of application No. 14/407,423, filed as application No. PCT/US2012/042499 on Jun. 14, 2012, now Pat. No. 9,835,027.

(51) Int. Cl.
| | |
|---|---|
| E21B 49/00 | (2006.01) |
| E21B 43/26 | (2006.01) |
| E21B 49/02 | (2006.01) |
| E21B 41/00 | (2006.01) |
| G01V 5/10 | (2006.01) |

(52) U.S. Cl.
CPC .......... *E21B 49/00* (2013.01); *E21B 41/0092* (2013.01); *E21B 43/26* (2013.01); *E21B 49/02* (2013.01); *G01V 5/104* (2013.01)

(58) Field of Classification Search
CPC ...... E21B 49/00; E21B 49/02; E21B 41/0092; E21B 43/36; G01V 5/04
See application file for complete search history.

(56) References Cited

U.S. PATENT DOCUMENTS

| | | | |
|---|---|---|---|
| 4,828,028 | A | 5/1989 | Soliman |
| 5,183,109 | A | 2/1993 | Poulsen |
| 5,444,619 | A | 8/1995 | Hoskins et al. |
| 6,002,985 | A | 12/1999 | Stephenson |
| 6,084,826 | A | 7/2000 | Leggett, III |
| 6,140,816 | A | 10/2000 | Herron |
| 6,795,773 | B2 | 9/2004 | Soliman et al. |
| 6,876,959 | B1 | 4/2005 | Peirce et al. |
| 7,277,796 | B2 | 10/2007 | Kuchuk et al. |
| 7,630,914 | B2 | 12/2009 | Veeningen et al. |
| 7,946,340 | B2 | 5/2011 | Surjaatmadja et al. |
| 8,184,502 | B2 | 5/2012 | Xu et al. |

(Continued)

FOREIGN PATENT DOCUMENTS

| | | |
|---|---|---|
| WO | WO-03023188 A1 | 3/2003 |
| WO | WO-2009099825 A1 | 8/2009 |

(Continued)

OTHER PUBLICATIONS

Morford et al. "Trace metal evidence for changes in the redox environment associated with transition from terrigenous clay to diatomaceous sediment, Saanich Inlet, BC," Marine Geology, 174, pp. 355-369 (Year: 2001).*

United States Patent and Trademark Office, Search Report and Written Opinion for Application PCT/US2012/042499, dated Aug. 31, 2012; 17 pages; United States of America.

(Continued)

*Primary Examiner* — John Fitzgerald

(57) ABSTRACT

Systems and related methods to alter and optimize the placement of fracture initiation points through utilization of mineralogy.

6 Claims, 4 Drawing Sheets

(56) References Cited

U.S. PATENT DOCUMENTS

| | | | |
|---|---|---|---|
| 9,835,027 B2* | 12/2017 | Stringer | E21B 41/0092 |
| 2003/0050758 A1 | 3/2003 | Soliman et al. | |
| 2004/0141414 A1 | 7/2004 | Huffman et al. | |
| 2005/0125209 A1 | 6/2005 | Soliman et al. | |
| 2009/0254283 A1 | 10/2009 | Jacobi et al. | |
| 2011/0144913 A1 | 6/2011 | Klein et al. | |
| 2011/0162846 A1 | 7/2011 | Palidwar et al. | |
| 2011/0220371 A1* | 9/2011 | Daussin | C02F 9/00 166/401 |
| 2012/0109603 A1 | 5/2012 | Li et al. | |
| 2015/0075775 A1 | 3/2015 | Davidson | |
| 2016/0042272 A1 | 2/2016 | Mohaghegh | |

FOREIGN PATENT DOCUMENTS

| | | |
|---|---|---|
| WO | WO-2009108432 A1 | 9/2009 |
| WO | WO-2012006871 A1 | 1/2012 |

OTHER PUBLICATIONS

European Patent Office, Supplementary European Search Report, Application No. 12879142, dated Jan. 5, 2016, 6 pages, Europe.
Buller et al., "Petrophysical Evaluation for Enhancing Hydraulic Stimulation in Horizontal Shale Gas Wells," *SPE Annual Technical Conference and Exhibition*, Florence, Italy, Sep. 19-22, 2010.
Examination Report issued for European Patent Application No. 12879142, dated Oct. 24, 2019, 5 pages.
Wright et al., "Application of Inorganic Whole Rock Geochemistry to Shale Resource Plays," *Canadian Unconventional Resources & International Petroleum Conference*, Calgary, Alberta, Canada, Oct. 19-21, 2010.

* cited by examiner

SYSTEM, METHOD, AND COMPUTER PROGRAM PRODUCT TO DETERMINE PLACEMENT OF FRACTURE STIMULATION POINTS USING MINEROLOGY

CROSS-REFERENCE TO RELATED APPLICATIONS

The present application is a divisional of U.S. application Ser. No. 14/407,423, filed on Dec. 11, 2014, which is a National Stage entry of International Patent Application No. PCT/US2012/042499, filed on Jun. 14, 2012, the benefits of which are claimed and the disclosures of which are incorporated herein by reference in their entireties.

FIELD OF THE INVENTION

The present invention generally relates to fracture completion strategies and, more specifically, to optimizing the placement of fracture intervals based upon a mineralogical analysis of the formation.

BACKGROUND

Conventionally, a very simplistic approach is used to determine fracture initiation points along a wellbore. The first fracture point is selected at random or based upon gas shows encountered while drilling (with weight given to low gamma sections), and the subsequent fracture points are evenly spaced apart from one another. This approach is based on the assumption that there is very little geological and mineralogical variation along the length of the wellbore. Although this is a simple and easy method for distributing the fracture treatments equally along the wellbore, it does nothing to target potentially productive intervals. Instead, operators almost blindly choose fracture points with no consideration for sound engineering. As a result, roughly 40% of completion clusters never produce hydrocarbons.

Accordingly, in view of the foregoing shortcomings, there is a need in the art for a fracture completion strategy which utilizes sound engineering to enable operators to select optimal fracture intervals, thereby increasing the efficiency of fracture placement and improving well production.

DESCRIPTION OF ILLUSTRATIVE EMBODIMENTS

Illustrative embodiments and related methodologies of the present invention are described below as they might be employed in a system for optimizing fracture completion strategies. In the interest of clarity, not all features of an actual implementation or methodology are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure. Further aspects and advantages of the various embodiments and related methodologies of the invention will become apparent from consideration of the following description and drawings.

Figure 1:
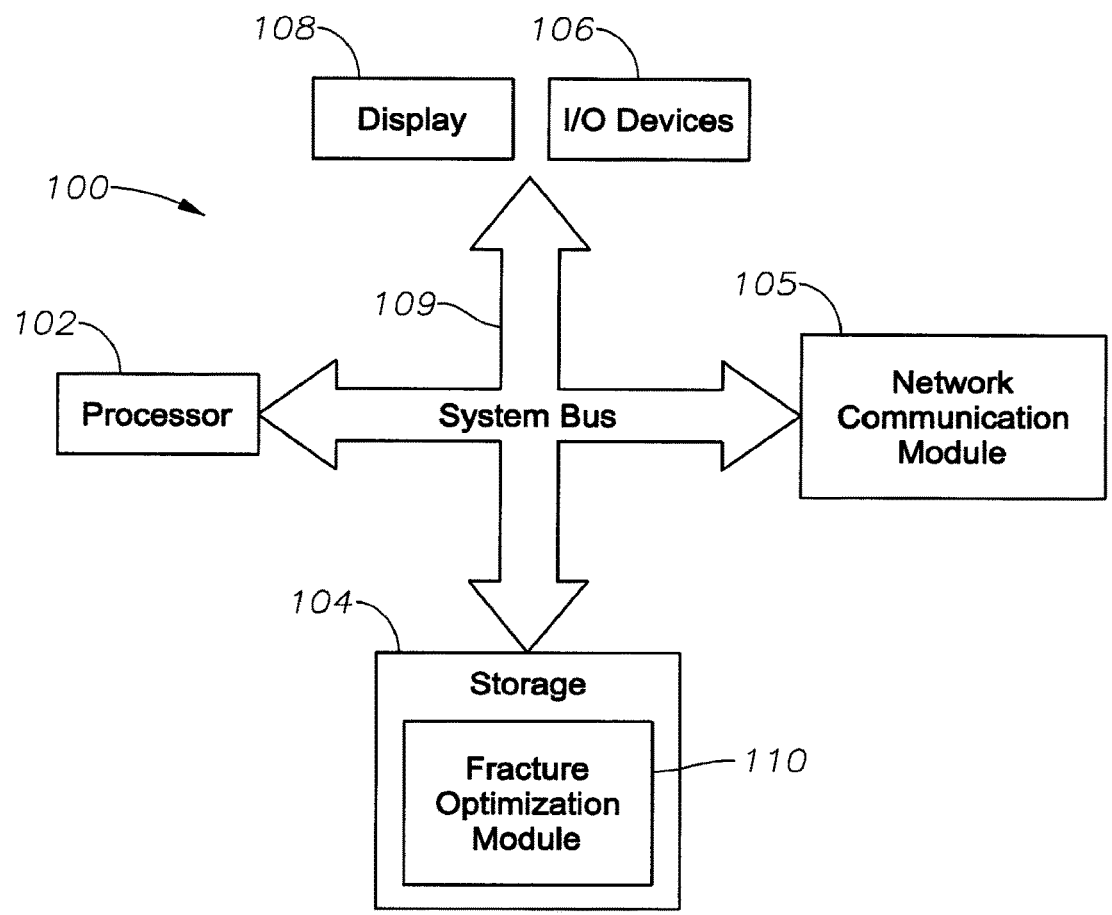
FIG. 1 illustrates a block diagram representing a fracture optimization system according to an exemplary embodiment of the present invention.

FIG. 1 shows a block diagram of fracture optimization system 100 according to an exemplary embodiment of the present invention. In one embodiment, fracture optimization system 100 includes at least one processor 102, a non-transitory, computer-readable storage 104, transceiver/network communication module 105, optional I/O devices 106, and an optional display 108, all interconnected via a system bus 109. Software instructions executable by the processor 102 for implementing software instructions stored within fracture optimization module 110 in accordance with the exemplary embodiments described herein, may be stored in storage 104 or some other computer-readable medium.

Although not explicitly shown in FIG. 1, it will be recognized that fracture optimization system 100 may be connected to one or more public and/or private networks via appropriate network connections. It will also be recognized that the software instructions comprising the fracture optimization module 110 may also be loaded into storage 104 from a CD-ROM or other appropriate storage media via wired or wireless means.

Figure 2:
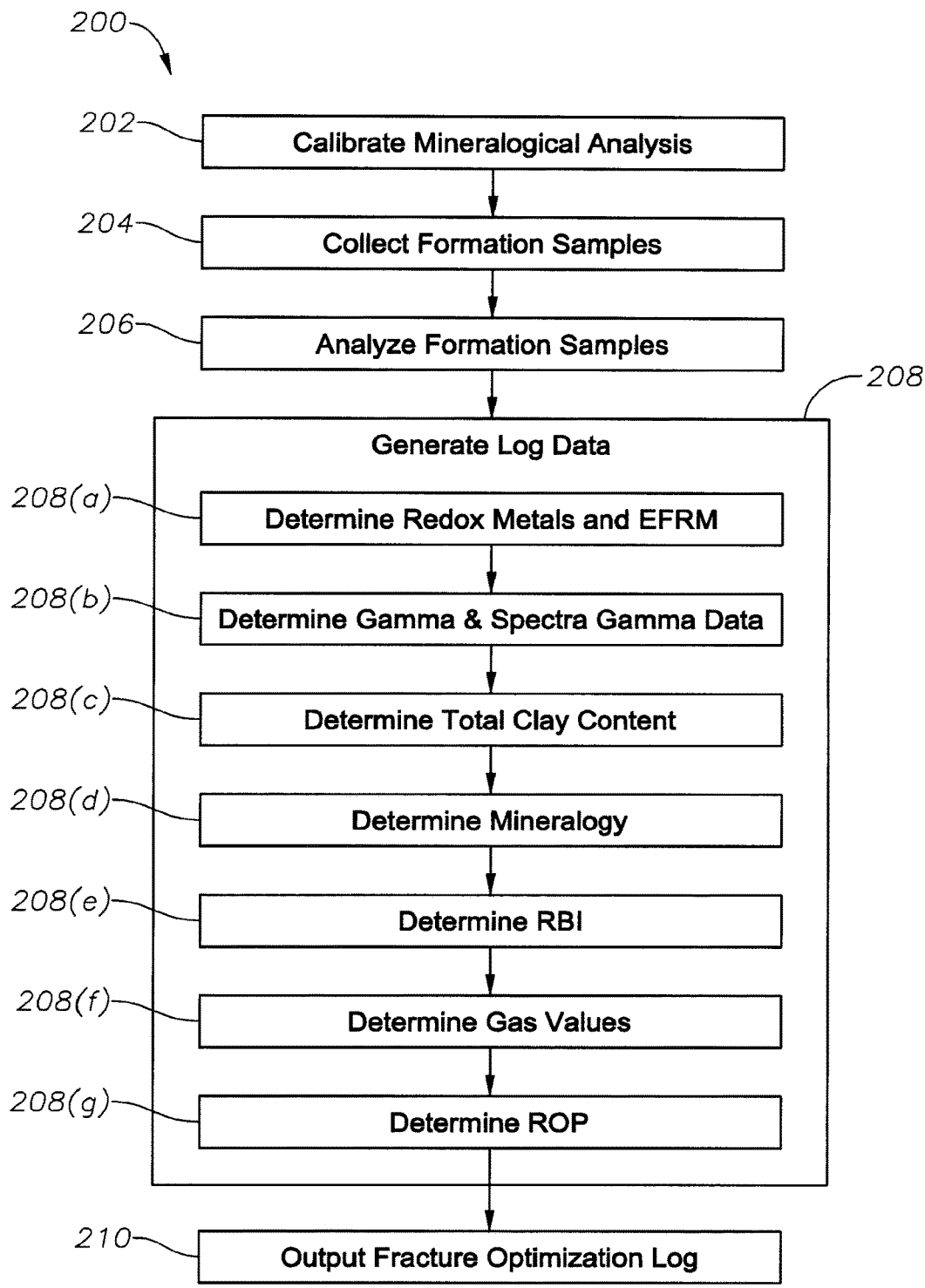
FIG. 2 illustrates a flow chart representing a method for fracture optimization according to an exemplary methodology of the present invention.

Referring to the exemplary methodology of FIG. 2, it will now be described how fracture optimization system 100 utilizes mineralogy to develop a log that facilitates optimal placement of fracture intervals. In general, mineralogy may be defined as the study of the chemistry, structure, and physical properties of minerals. At step 202, processor 102, utilizing formation optimization module 110, calibrates the mineralogical analysis. In order to accomplish the calibration, the formation is cored along the wellbore. Samples are then taken as desired throughout the core and analyzed, typically, using a Induce Couple Plasma Spectroscopy/Mass Spectroscopy ("ICP"). Another set of core samples are then analyzed using, for example, a Spectros X-Ray florescence ("XRF") instrument or a Laser Induced Breakdown Spectroscopy ("LIB") instrument, dependent upon the type of data desired. In this exemplary embodiment, core samples are taken every 1.5 feet. Utilizing chemostratigraphy, processor 102 then correlates the ICP data to the XRF or LIB data across the cored interval, thereby determining the elements and the concentrations of the major and minor elements/compounds of the core samples, as would be understood by one ordinarily skilled in the art having the benefit of this disclosure. As described below, this information plus ratios of elements are used to determine and model clay content, relative brittleness index ("RBI"), redox metals, and elevated factor redox metals ("EFRM").

During testing of the present invention, analyzed core results identified eight beds where the clay content was greater than 15% and four beds where the clay content was greater than 30%. Based upon this, it was discovered there is a direct correlation between the EFRM (e.g., elevated factor vanadium, uranium, nickel, cobalt, copper, chromium, etc.) values and the clay content in wellbores. As a result, it was shown that EFRM equals the number of times that a redox metal is enriched over the average redox metal content in a Post Archean Australian Shale ("PAAS"), which is standardized to aluminum using the following equation:

$$EFRM=(RMV/Al(Sample))/(RM/Al(PAAS))$$    Equation 1.1:

Furthermore, test data showed that EFRM is a relative indicator of total organic carbon, which implies the presence of hydrocarbons. Also, RBI values get lower as clay content increases, which indicates a more ductile environment.

After calibration is complete at step 202, formation samples are collected during drilling of the wellbore at step 204. In this exemplary embodiment, measured while drilling ("MWD") and mudlogging methods may be utilized to retrieve and analyze the cutting samples from which elemental information will be derived. Also, the samples may be taken at a desired capture rate in the vertical or horizontal sections of the wellbore. For example, a sample capture rate of every 20 to 30 feet is typical in the horizontal section of the wellbore. After collection, the cutting samples are sieved, rinsed with solvents to remove as much drilling mud as possible, and a magnet is used to clean out any metal that may have found its way into the sample during the drilling process. In this exemplary embodiment, the analysis is performed on-site to assist with directional drilling. However, as would be understood by one ordinarily skilled in the art having the benefit of this disclosure, the analysis may be performed off-site as well. Thereafter, the samples are then dried, weighed, crushed, and pelletized.

At step 206, processor 102 analyzes the samples utilizing the necessary instrumentation, such as XRF, in order to determine the elements which make up the pelletized samples. At step 208, processor 102 utilizes the elemental data to generate the log data. The resulting elemental data, such as nickel, copper, vanadium or other redox metals, indicates carbon rich zones. For example, if vanadium was found in high concentrations in the formation, an elevated factor vanadium ("EFV") would be calculated. If you have more than one redox metal present in high concentrations, one or both may be selected. Thus, at step 208(a), processor 102 utilizes one of the redox metals, vanadium, to determine the EFV (used in place of EFRM), using Equation 1.1, where V equals the vanadium content of the sample determined using the XRF instrumentation. If the EFV is greater than 1, this indicates an environment where hydrocarbons are being produced. If EFV is over 10, this indicates a strong producing zone. Accordingly, a tiered ranking system could be employed which identifies poor, moderate, and strong producing intervals, as would be understood by one ordinarily skilled in the art having the benefit of this disclosure.

At step 208(b), processor 102 generates a gamma log based on the uranium content of the pelletized sample. Here, the gamma data received during drilling is correlated against wireline data to determine if shifts in depth are necessary. Next, processor 102 generates the spectra gamma (potassium, thorium, and uranium), which indicates the presence of volcanic ash. If volcanic ash is present, this indicates an undesirable fracturing point. At step 208(c), processor 102 models the clay content and breaks it down into total clay and illite clay. During testing of the present invention, it was discovered that high total clay content zones do not produce well. Next, processor 102 determines the mineralogy (208(d)), RBI (208(e)), gas values (208(f)) and ROP (208(g)). Those ordinarily skilled in the art having the benefit of this disclosure realize there are a variety of means by which the log data determined in step 208 may be modeled and/or generated.

At step 210, processor 102 utilizes the correlated data to generate and output a fracture optimization log of the wellbore, which will be used to determine the optimal fracture initiation intervals. In an alternative embodiment, processor 102 may also correlate the generated log data to wireline data, particularly in new basins, if confirm data integrity.

Figure 3:
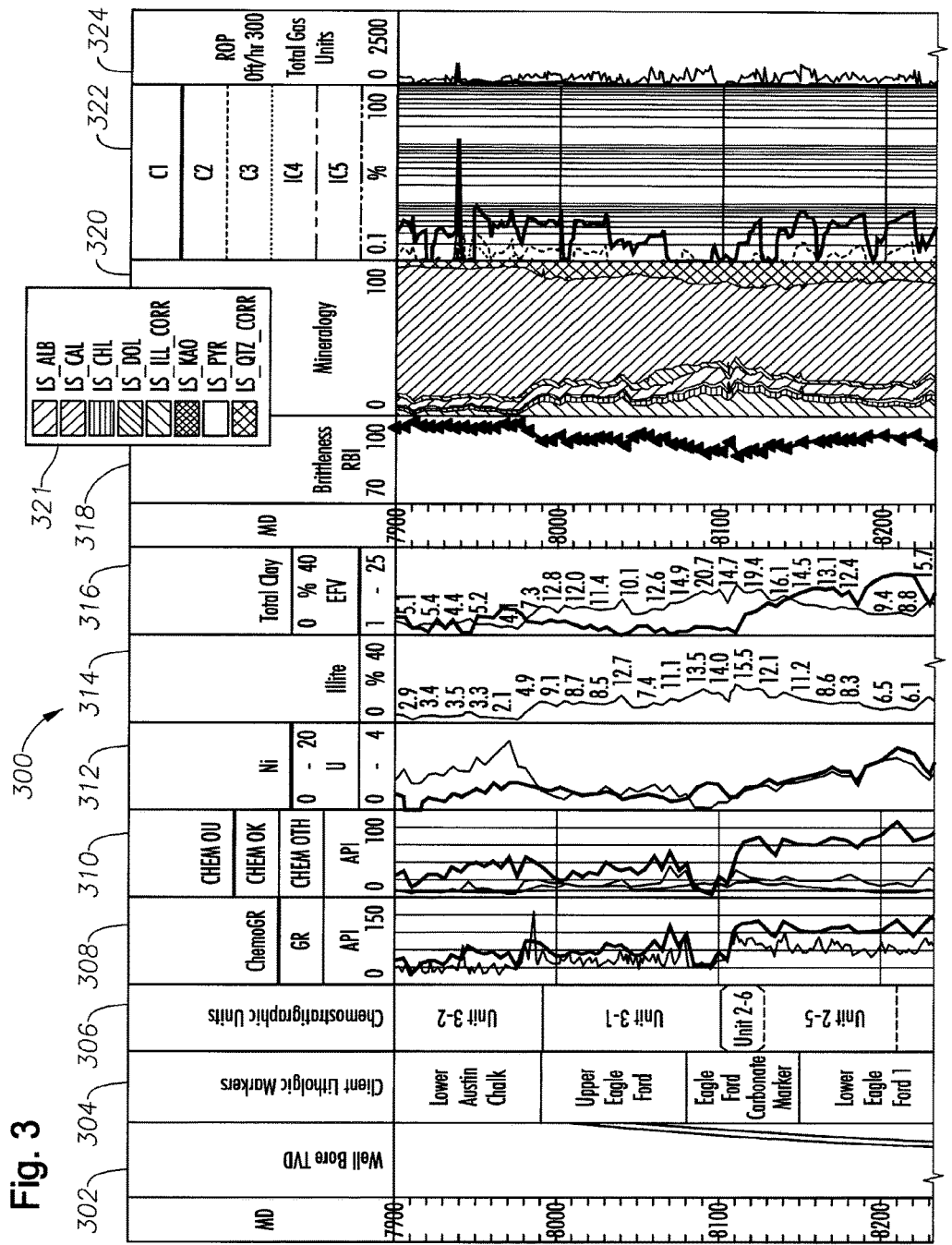
FIG. 3 illustrates a fracture optimization log according to an exemplary embodiment of the present invention.

FIG. 3, illustrates a fracture optimization log 300 produced by fracture optimization system 100 (step 210) according to an exemplary embodiment of the present invention. Column 302 plots the wellbore track, which is used to show the inclination of the borehole. Column 304 plots an end-user's naming convention for the various rock layers and formations (i.e., lithologic markers), which provides a correlation between two different units (e.g., to show correlation between proprietary lithologic units and the standard chemostratigraphic units). Column 306 plots the chemostratigraphic units, which are the units used to define layers of chemically similar rock. Column 308 plots the gamma and chemo-gamma overlay on a scale of 0-150 API in order to determine sample lag accuracy, depth tie-in to other logs and fracture placement, sample quality and borehole conditions.

In further reference to FIG. 3, column 310 plots the uranium, potassium, and thorium (spectra gamma) data on a scale of 0-100 API, which is used to define the continental source rock (typically volcanic ash) which can reflect a high clay content and, thus, a potential drilling hazard. Column 312 plots the redox metals, which indicate total organic carbon content, as discovered during testing of the present invention; thus, the presence of redox metals indicate highly organic rich zones. In this exemplary embodiment, nickel and uranium are used as the redox metals because the exemplary wellbore comprised these metals. However, those ordinarily skilled in the art having the benefit of this disclosure realize that different formations would comprise different redox metals that would indicate the presence of carbons. Nickel is plotted on a scale of 0-20, while uranium is plotted on a scale of 0-4.

Column 314 plots the illite clay content on a scale of 0-40%, which is used to determine the illite-smectite fraction of the sediment. When the illite clay content is compared to the XRD data, it indicates the swelling potential of the clay in the formation. In this exemplary embodiment, the actual illite clay content percentage is listed along the plotted line, thus making it easier to determine the respective percentage at any given depth. Column 316 plots the total clay and EFV, which are used to determine the total clay content percentage of the rocks and vanadium content (also indicative of a depositional environment). Total clay is measured plotted on a scale of 0-40%, while EFV is plotted on a scale of 1-25. In this exemplary embodiment, the total clay percentage value is listed along the plotted line, thus making it easier to determine the respective percentage at any given depth. Column 318 plots the RBI on a scale of 70-100, a calculated curve that indicates the fracability along the rock formation. In general, as discovered during testing of the present invention, a higher RBI indicates increased fracturing potential.

Column 320 plots the mineralogy of the formation cuttings along a scale of 0-100. Box 321 includes a listing of all the minerals plotted along column 320, along with their color-coded indicators. However, other indicators may be utilized to distinguish one mineral plot line from another, as would be understood by persons ordinarily skilled in the art having the benefit of this disclosure. Column 322 plots the C1-C5 gas values receives from the mudloggers, each plotted on a scale of 0.1-100. Column 324 plots the MWD rate of penetration ("ROP") along with the mudloggers total hydrocarbon gas. ROP is plotted on a scale of 0-300 ft/hr, while the total gas units are plotted on a scale of 0-2500.

Figure 4:
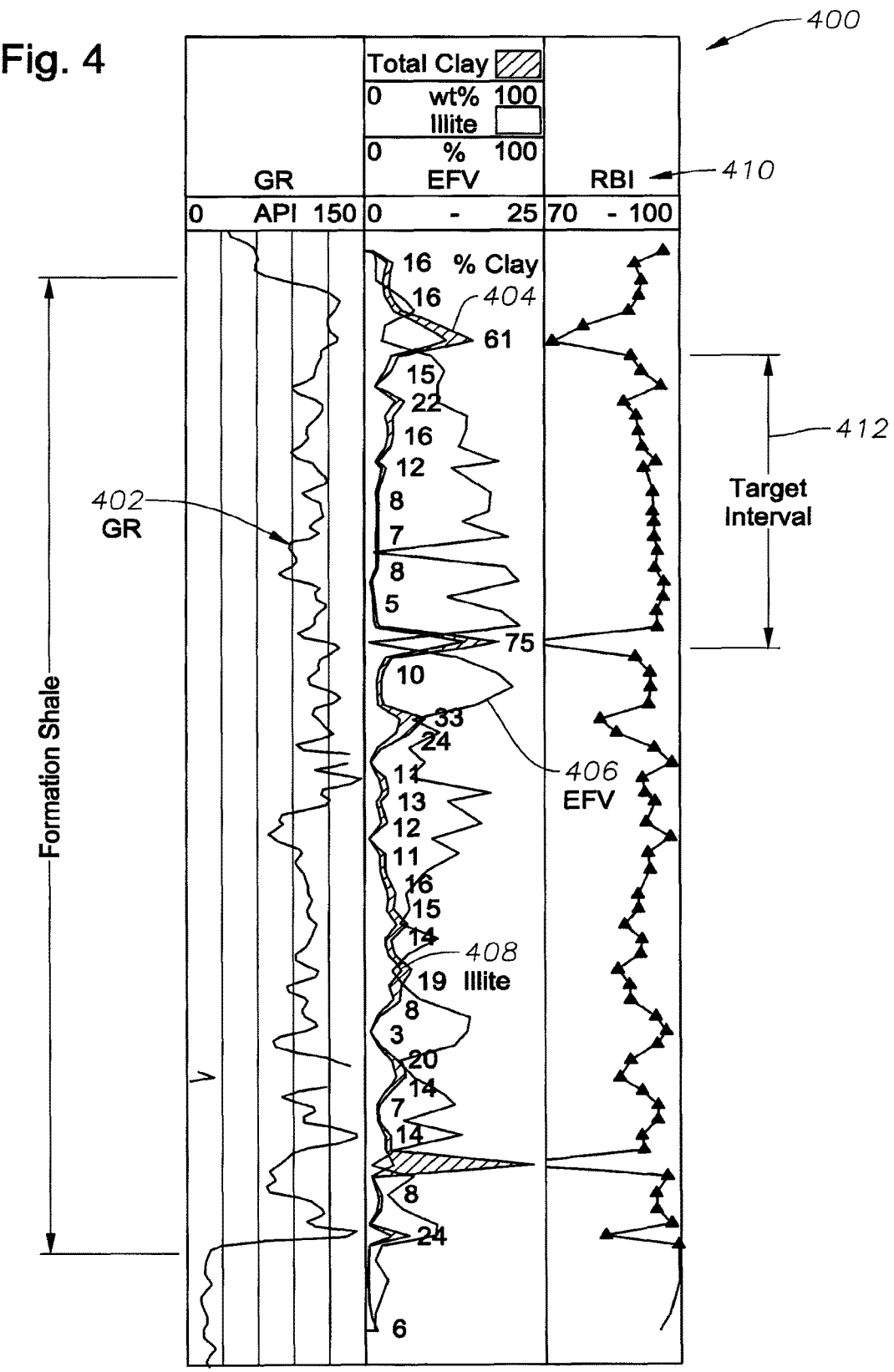
FIG. 4 illustrates a fracture optimization log according to an alternative exemplary embodiment of the present invention.

FIG. 4 illustrates fracture optimization log 400 produced by fracture optimization system 100 according to an alternative exemplary embodiment of the present invention. Essentially, fracture optimization log 400 is a simplified version of fracture optimization log 300 that only plots the drilling gamma ray data 402, total clay content 404, redox metal 406, illite clay 408, and RBI 410. In this embodiment, redox metal 406 is reflected as EFV. The gamma ray data 402 is plotted on a scale of 0-150 API, total clay 404 and illite clay 408 on a scale of 0-100%, EFV on a scale of 0-25, and the RBI on a scale of 70-100. However, as previously mentioned, other formations may contain other redox metals which may be utilized instead. Moreover, one of ordinary skill in the art having the benefit of this disclosure realizes that the scales and ranges utilized in fracture optimization logs 300,400 may be altered as necessary.

As previously stated, the optimal fracture interval locations are determined through utilization of the mineralogical information contained in formation optimization logs 300 & 400. In exemplary embodiments, the primary parameters that are utilized in this determination are the RBI, the EFV, and the total clay. In other embodiments, however, other redox metals may be utilized such as, for example, uranium, nickel, copper, cobalt, chromium, etc. Also, fracture optimization log 300 includes additional information to aid geologists in gaining a deeper understanding of the wellbore characteristics.

Through testing of the present invention, it has been discovered that intervals having a high RBI, high EFRM, and low clay are most desirable ("optimization criteria"). Fracture intervals meeting these criteria are easy to initiate, plus their high RBI results in their ability to generate moderate fracture complexity. High EFRM values are to be targeted, as they infer the presence of hydrocarbons, while low clay content is also preferred to minimize the possibility of losing the connectivity between the fracture and the wellbore due to clay swelling and embedment (resulting in a choked fracture).

Accordingly, after fracture optimization logs 300 & 400 have been produced by fracture optimization system 100 (step 210), an end-user (field personnel, etc.) may review the log to determine the most optimal location for the fracture intervals. The operator would then review logs 300,400 to identify those intervals, and their respective depths, which have high RBI and EFRM values, and low total clay content. For example, referring to formation optimization log 400, target interval 412 meets these criteria. Therefore, this interval should be primarily targeted for fracturing operations. Other intervals meeting the optimized criteria may then be targeted in a tiered approach or as otherwise desired.

In an alternate exemplary embodiment of the present invention, fracture optimization system 100 may itself determine the most optimal location for fracture intervals based on the data plotted in fracture optimization logs 300 & 400. Here, processor 102, utilizing fracture optimization module 110, will analyze the data plotted in fracture optimization logs 300 & 400 at step 210. Thereafter, processor 102 will determine those intervals which meet the optimization criteria, and output the results. The result may be output in a variety of forms, such as, for example, formation optimization logs 300 & 400 may include an extra column which indicates the optimal fracture locations and their respective depths or this information may be outputted in a stand alone report. Moreover, the identified intervals may be identified in a tiered format such as, for example, poor, moderate, and strong producing intervals.

Although various embodiments and methodologies have been shown and described, the invention is not limited to such embodiments and methodologies and will be understood to include all modifications and variations as would be apparent to one skilled in the art. Therefore, it should be understood that the invention is not intended to be limited to the particular forms disclosed. Rather, the intention is to cover all modifications, equivalents and alternatives falling within the spirit and scope of the invention as defined by the appended claims.

What I claim is:

1. A method to determine placement of fracture initiation points along a wellbore, the method comprising:
   analyzing mineralogical characteristics of one or more intervals along the wellbore;
   determining which of the one or more intervals include mineralogical characteristics that have a higher relative brittleness index value, a higher elevated factor redox metal value, and a lower total clay content than the mineralogical characteristics of other intervals along the wellbore, based on the analysis; and
   determining the placement of the fracture initiation points along the wellbore based upon the mineralogical characteristics of the one or more intervals determined to have higher relative brittleness index values, higher elevated factor redox metal values, and lower total clay content than those of the other intervals.

2. A method as defined in claim 1, further comprising ranking the one or more intervals based upon production capability as determined by the mineralogical characteristics.

3. A method as defined in claim 1, wherein determining which of the one or more intervals include mineralogical characteristics that have a higher relative brittleness index value, a higher elevated factor redox metal value, and a lower total clay content further comprises creating a log which plots the mineralogical characteristics of the one or more intervals along the wellbore, the placement of the fracture initiation points being determined based upon the log.

4. A method as defined in claim 3, wherein the one or more intervals determined to have the mineralogical characteristics with the higher relative brittleness index values, higher elevated factor redox metal values, and lower total clay content than those of the other intervals are determined to be the fracture initiation points.

5. A method as defined in claim 1, wherein the mineralogical characteristics include at least one of an elevated factor redox metal or a total clay content.

6. A method as defined in claim 5, wherein the elevated factor redox metal is at least one of vanadium, nickel, chromium, cobalt, copper, or uranium.

* * * * *